Oct. 21, 1930.  A. G. CARLSON  1,778,846
BAKING PAN
Filed May 4, 1929
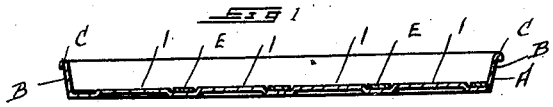
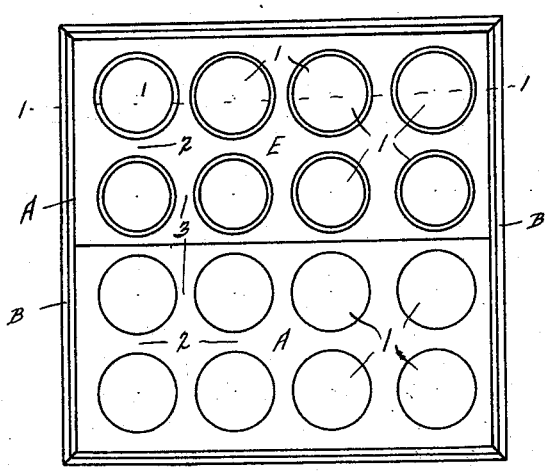
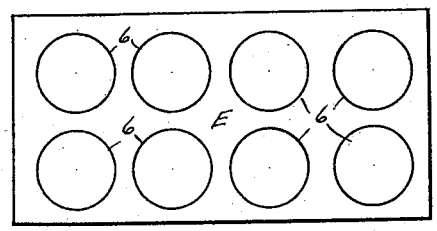
Inventor
Alfred G. Carlson
By R. M. Thomas
Attorney Patented Oct. 21, 1930

1,778,846

UNITED STATES PATENT OFFICE

ALFRED G. CARLSON, OF TOOELE, UTAH

BAKING PAN

Application filed May 4, 1929. Serial No. 360,383.

My invention relates to baking and has for its object to provide a new and efficient baking pan in which rolls and other similar types of cakes, cookies and bread may be placed when baking and from which they may be removed easily and when they are removed from the pan they may be placed in a case or suitable container so that they will not sweat or heat on the bottom.

A further object is to provide a baking pan which will have a false bottom therein, which bottom when removed, will remove the material being baked and which may then be set aside to cool.

A still further object is to provide a baking pan having circular portions over the entire bottom surface thereof said portions being slightly raised from the level of the bottom of the pan, and a false bottom adapted to encircle said raised portions and fill the remaining surface of the pan flush with the top surface of the raised portions so that when the material being baked is placed in the pan the surface of the pan will be level but when the baking has been finished the product may be removed from the pan by lifting the false bottom and when removed from the pan the holes in the false bottom will aerate the product, preventing it from sweating, heating or becoming soggy after it has been baked.

These objects I accomplish with the device illustrated in the accompanying drawings in which similar numerals and letters of reference indicate like parts throughout the several views and as described in the specification forming a part of this application and pointed out in the appended claims.

In the drawings in which I have shown the best and mose preferred manner of building my invention Figure 1 is a section on line 1—1 of Figure 2. Figure 2 is a plan view of the baking pan showing one section of the false bottom removed. Figure 3 is a plan view of the false bottom. In the drawings I have illustrated the baking pan as A having side walls B formed therearound and having the top portion of the side walls bent back upon itself at C to form a rim around the entire pan. I then form spaced apart circular raised sections 1 over the surface of the bottom of the pan. Said raised sections 1 are bent up from the bottom level of the pan the approximate thickness of the metal in the pan. The said raised sections 1 are spaced from each other by portions 2 and 3, said portions 2 and 3 being on the level of the original bottom of the pan. In forming the raised sections the side walls thereof are formed slightly slopping from the base of the pan to the top of the raised portion. Superimposed over the top and surrounding each and every one of the raised portions I then place a false bottom E, said bottom being formed perfectly flat of the same thickness of the bottom of the pan A, and having spaced apart circular openings 6 cut therethrough. The said openings 6 being spaced apart in each direction the same width from each other as the raised portions 1 in the pan A are from each other and said sections are adapted to fit down and completely encircle each of the raised sections in the pan A.

In the drawings I have shown the pan having two false bottoms E therein so that one portion may be removed at a time. It will be obvious that the entire base of the pan might be covered with a single false bottom or that more sections could be placed therein without departing from the spirit of the invention or the scope of the claims.

The operation of the device is as follows:

The false bottom E is placed in the pan A with the holes 6 encircling the raised portions 1 and the pan is ready for use. Rolls, small loaves of bread, biscuits, and other similar articles in the form of uncooked dough may then be placed on the raised portions 1 of the pan. Sufficient dough being placed thereon so that after the material is baked it will expand to such an extent that the sides thereof are resting on the periphery of the holes 6 in the false bottom E. After the material has been baked and removed from the oven a knife or other suitable implement may be inserted under one edge of the false bottom and the false bottom raised from the pan. This removes all of the material from the pan which has been baked on that section of the false bottom;

after it is removed it may then be placed in any suitable container or in the open air for cooling. The other sections of the pan may be removed in a like manner. The pan may then be washed, the false bottom reinserted therein and the entire device used again.

Having thus described my invention, I desire to secure by Letters Patent and claim:

1. In a baking pan the combination of a sheet metal pan having sidewalls therearound and having circular spaced apart raised sections struck from the bottom of said pan; and a false bottom having circular spaced apart openings therein adapted to encircle the raised sections in said pan and to be raised therefrom when the baking is finished to remove the baked product from the pan.

2. In a baking pan the combination of a sheet metal pan; spaced apart raised sections struck from the bottom portion thereof with the top surface of the raised sections parallel with the bottom of the pan; sheets of metal having circular openings therethrough adapted to be placed in said pan to encompass the raised sections in the bottom of said pan, and to be removed separately or jointly from said pan, to remove the finished product.

In testimony whereof he has affixed his signature.

ALFRED G. CARLSON.